US010946756B2

(12) United States Patent
Malek et al.

(10) Patent No.: US 10,946,756 B2
(45) Date of Patent: Mar. 16, 2021

(54) BIDIRECTIONAL INTEGRATED CHARGER FOR A VEHICLE BATTERY

(71) Applicant: FORD GLOBAL TECHNOLOGIES, LLC, Dearborn, MI (US)

(72) Inventors: Hadi Malek, Dearborn, MI (US); Shuitao Yang, Beaumont, TX (US); James A. Lathrop, Saline, MI (US); Mark J. Ferrel, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 151 days.

(21) Appl. No.: 15/812,498

(22) Filed: Nov. 14, 2017

(65) Prior Publication Data

US 2019/0143822 A1 May 16, 2019

(51) Int. Cl.
| | |
|---|---|
| H02J 7/00 | (2006.01) |
| B60L 53/20 | (2019.01) |
| H02J 7/02 | (2016.01) |
| H02M 3/335 | (2006.01) |
| H02M 7/797 | (2006.01) |
| H02M 3/158 | (2006.01) |
| H02M 1/00 | (2006.01) |

(52) U.S. Cl.
CPC ............... B60L 53/20 (2019.02); H02J 7/00 (2013.01); H02J 7/022 (2013.01); H02M 3/33584 (2013.01); H02M 7/797 (2013.01); *B60L 2210/10* (2013.01); *B60L 2210/30* (2013.01); *B60L 2210/40* (2013.01); *H02M 3/158* (2013.01); *H02M 2001/007* (2013.01)

(58) Field of Classification Search
USPC ................................................. 320/109, 108
See application file for complete search history.

(56) References Cited

U.S. PATENT DOCUMENTS

| | | | | |
|---|---|---|---|---|
| 5,581,171 A | | 12/1996 | Kerfoot et al. | |
| 5,633,577 A | * | 5/1997 | Matsumae | H02J 7/0013 322/37 |
| 5,726,551 A | * | 3/1998 | Miyazaki | H02J 7/0018 320/124 |
| 6,297,616 B1 | * | 10/2001 | Kubo | H02J 7/0027 320/116 |
| 8,692,512 B2 | * | 4/2014 | Tanikawa | B60L 53/22 320/109 |
| 9,300,148 B2 | * | 3/2016 | Oh | H02J 7/0022 |

(Continued)

FOREIGN PATENT DOCUMENTS

CN 205829488 U 12/2016

*Primary Examiner* — Samuel Berhanu
(74) *Attorney, Agent, or Firm* — David B Kelley; Brooks Kushman PC

(57) ABSTRACT

A vehicle includes an integrated power distribution module. The integrated power distribution module includes a hybrid transformer coupled to a charger stage, a traction battery, and an auxiliary battery. The hybrid transformer includes first and second primary windings coupled in series and connected to the charger stage. The primary windings have a corresponding first secondary winding coupling the traction battery via associated inverters. The primary windings further have corresponding second secondary windings that are coupled in series with opposing voltage polarities and coupled to the auxiliary battery via an associated inverter.

20 Claims, 3 Drawing Sheets

(56) References Cited

U.S. PATENT DOCUMENTS

| | | | |
|---|---|---|---|
| 2008/0084714 A1* | 4/2008 | Kawasaki | H02M 3/33576 363/21.01 |
| 2009/0322155 A1* | 12/2009 | Oh | H02J 7/0016 307/87 |
| 2010/0007308 A1* | 1/2010 | Lee | H02J 7/0018 320/118 |
| 2011/0273136 A1* | 11/2011 | Yoshimoto | H02M 1/10 320/103 |
| 2013/0069586 A1* | 3/2013 | Jung | H04B 5/0037 320/108 |
| 2016/0001665 A1 | 1/2016 | Kim et al. | |
| 2016/0016479 A1 | 1/2016 | Khaligh et al. | |

\* cited by examiner

BIDIRECTIONAL INTEGRATED CHARGER FOR A VEHICLE BATTERY

TECHNICAL FIELD

This application generally relates to an integrated charger and DC/DC converter module for an electrified vehicle.

BACKGROUND

Hybrid-electric and electric vehicles utilize stored energy for propulsion. Energy may be received from an electrical grid during a charging event. An on-board generator may also generate energy during regenerative braking events. Electrified vehicles rely on various electrical systems to manage and distribute power to the various components. Electrified vehicles often utilize contactors and switches to manage the power flow between high-voltage electrical devices. However, contactors and switches may degrade over time resulting in situations in which power flow cannot be managed.

SUMMARY

A vehicle includes a hybrid transformer including first and second primary windings electrically coupled in series and selectively electrically coupled to an external source, each of the primary windings associated with a first secondary winding selectively electrically coupled to a traction battery and associated with a second secondary winding, the second secondary windings electrically coupled in series with opposing voltage polarity to define a port that is selectively electrically coupled to an auxiliary battery.

The first and second primary windings may be coupled to the external source by at least one power inverter that is configured to bidirectionally convert power between direct current (DC) and alternating current (AC). The first and second primary windings may be coupled to the external source by a boost converter that is configured to bidirectionally convert a DC power level. Each of the first secondary windings may be selectively electrically coupled to the traction battery by an inverter that is configured to bidirectionally convert power between direct current (DC) and alternating current (AC). The port may be selectively electrically coupled to the auxiliary battery by an inverter that is configured to bidirectionally convert power between direct current (DC) at the auxiliary battery and alternating current (AC) at the port. The hybrid transformer may be configured to, responsive to the first and second primary windings being coupled to the external source and the external source providing power, transfer power to the traction battery via each of the first secondary windings and provide no power to the auxiliary battery via the port. The hybrid transformer may be configured to, responsive to selectively coupling the traction battery to the first secondary winding associated with the first primary winding to provide an alternating current (AC) voltage, output AC voltage to the external source via the first primary winding and to the auxiliary battery via the port. The hybrid transformer may be configured to, responsive to selectively coupling the traction battery to each of the first secondary windings to provide an alternating current (AC) voltage such that the AC voltage provided to the first secondary winding associated with the first primary winding is 180 degrees out of phase with the AC voltage provided to the first secondary winding associated with the second primary winding, output AC voltage to the auxiliary battery via the port and provide AC voltage to the first and second primary windings such that a voltage across the series combination of the first and second primary windings is zero.

A vehicle power distribution system includes a hybrid transformer including first and second primary windings electrically coupled in series to a first port that is selectively electrically couplable to an external source, each with a first secondary winding selectively electrically coupled to a traction battery, and each with a second secondary winding that are collectively coupled in series with opposing voltage polarities defining a second port that is selectively electrically coupled to an auxiliary battery.

The vehicle power distribution system may further include an onboard charger including at least one bidirectional AC/DC conversion stage for selectively electrically coupling the first port to the external source. The vehicle power distribution system may further include a first inverter circuit for selectively coupling the first secondary winding associated with the first primary winding to the traction battery, a second inverter circuit for selectively coupling the first secondary winding associated with the second primary winding to the traction battery, and a third inverter circuit for selectively coupling the second port to the auxiliary battery. The hybrid transformer may be configured to, responsive to the first port being selectively coupled to the external source and the external source providing power, transfer power to the traction battery via each of the first secondary windings and provide zero power to the auxiliary battery via the second port. The hybrid transformer may be configured to, responsive to selectively coupling the traction battery to the first secondary winding associated with the first primary winding, transfer power to the external source via the first port and to the auxiliary battery via the second port. The hybrid transformer may be configured to, responsive to selectively coupling the traction battery to each of the first secondary windings such that voltages supplied to the first secondary windings are 180 degrees out of phase with one another, transfer power to the auxiliary battery via the second port and provide zero power to the to the first port. The first primary winding and corresponding first secondary winding may be characterized by a turns ratio that has a same value as the turns ratio that characterizes the second primary winding and corresponding first secondary winding. A turns ratio that characterizes the first primary winding and corresponding second secondary winding may have a same value as the turns ratio that characterizes the second primary winding and corresponding second secondary winding.

An integrated vehicle power distribution module includes a transformer, a charger coupled to a series combination of first and second primary windings of the transformer, first and second inverters coupled between a traction battery and first secondary windings associated with each of the primary windings, and a third inverter coupled between an auxiliary battery and second secondary windings associated with each of the primary windings and connected in series with opposed voltage polarities.

The transformer may be configured to, responsive to the charger being coupled to an external source and the external source providing power, transfer power to the first and second inverters via each of the first secondary windings such that zero power is transferred to the third inverter. The transformer may be configured to, responsive to operating the first inverter to provide alternating current (AC) voltage to the first secondary winding associated with the first primary winding, transfer power to the charger via the first primary winding and to the third inverter via the second secondary winding associated with the first primary winding. The transformer may be configured to, responsive to operating the first and second inverters to provide alternating current (AC) voltages to the first secondary windings which are 180 degrees out of phase with one another, transfer power to the third inverter and transfer zero power to the charger.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
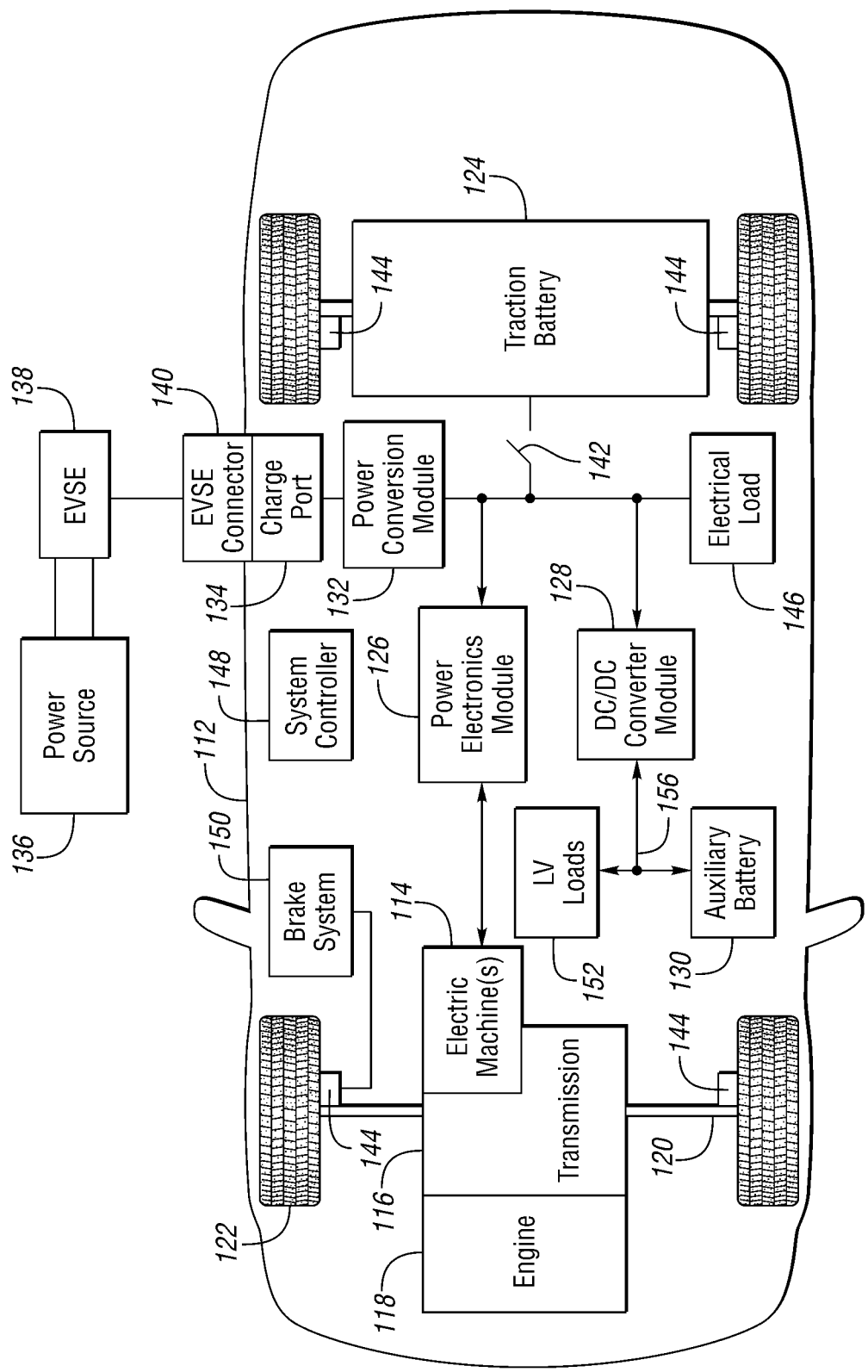
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

In some configurations, the electrified vehicle 112 may be configured to provide power to an external load. For example, the electrified vehicle may be configured to operate as a back-up generator or power outlet. In such applications, a load may be connected to the EVSE connector 140 or other outlet. The electrified vehicle 112 may be configured to return power to the power source 136. For example, the electrified vehicle 112 may be configured to provide alternating current (AC) power to the electrical grid. The voltage supplied by the electrified vehicle may be synchronized to the power line.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

As depicted, the vehicle 112 may include the power conversion module 132 for transferring power from the external power source 136 to a high-voltage bus of the vehicle 112. The vehicle 112 also includes the DC/DC converter module 128 for converting the voltage of the high-voltage bus to a voltage level suitable for the auxiliary battery 130 and low-voltage loads 152 (e.g., around 12 Volts). The vehicle 112 may further include additional switches, contactors and circuitry to selectively select power flow between the traction battery 124 to the DC/DC converter 128 and/or between the power conversion module 132 and the traction battery 124. To reduce cost and packaging complexities it may be desired to combine the power conversion module 132 and the DC/DC converter module 128 into a single, integrated unit. An integrated unit may help to enhance hardware utilization of the components and may reduce the number of active and passive components that are present in the vehicle. Further, the integrated unit may have improved cooling capabilities. In addition, the packaging space required may be reduced.

Figure 2:
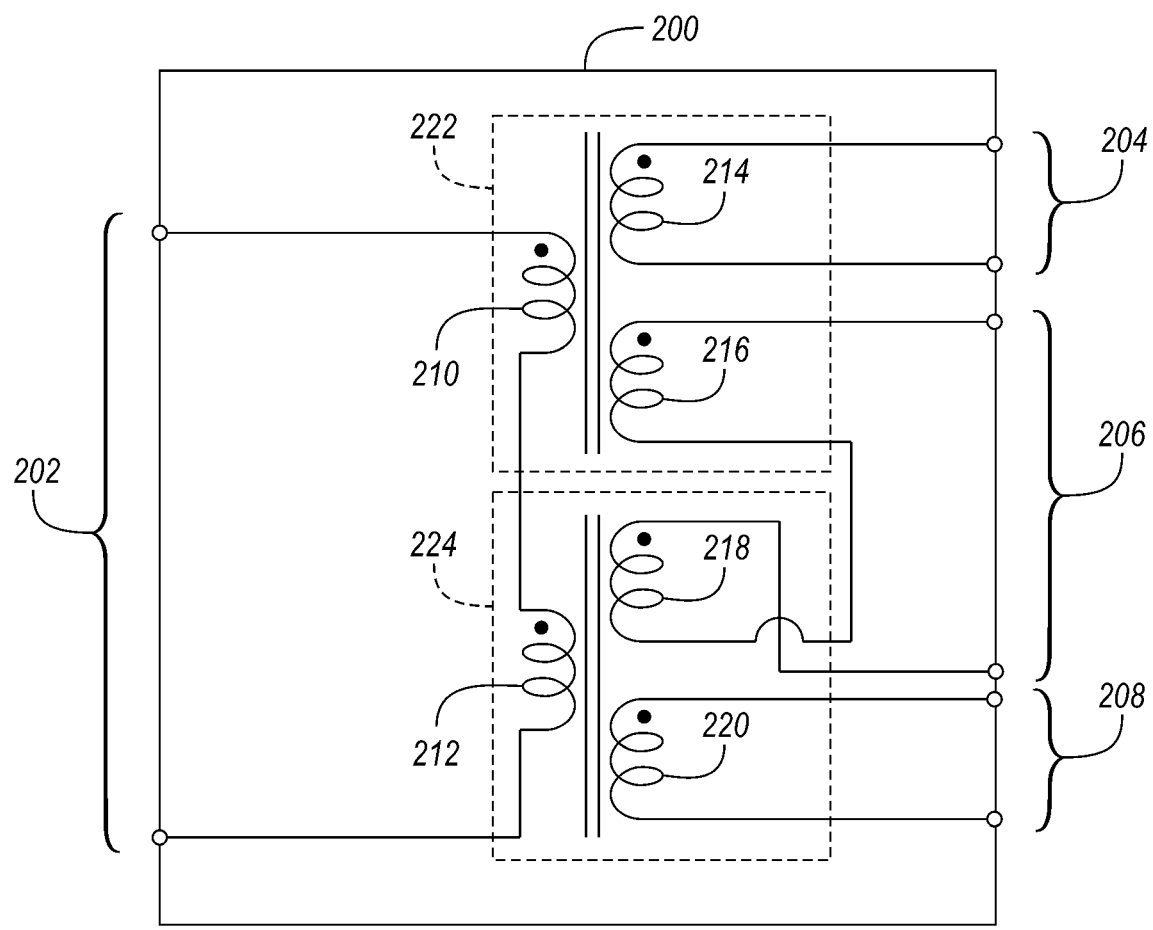
FIG. 2 is a schematic of a hybrid transformer.

Integration of the power conversion module 132 and the DC/DC converter module 128 may be achieved by the incorporation of a transformer. FIG. 2 depicts a diagram of a hybrid transformer 200. The hybrid transformer 200 may be referred to as a double transformer hybrid. The hybrid transformer may be represented schematically as two transformers (222, 224). The hybrid transformer 200 may define a number of ports. A port may be defined as a pair of terminals to which an electrical component or circuit may be electrically coupled. The hybrid transformer 200 may be a multiple winding configuration. The hybrid transformer 200 may include a plurality of primary windings and a plurality of secondary windings as shown.

The hybrid transformer 200 may include a pair of multiple winding transformers. For example, each multiple winding transformer may have a single primary coil and a pair of secondary coils. A first transformer 222 may include a first primary winding 210 and corresponding first secondary winding 214 and second secondary winding 216. A second transformer 224 may include a second primary winding 212 and corresponding third secondary winding 218 and fourth secondary winding 220.

The first primary winding 210 and the second primary winding 212 may be electrically coupled in series (e.g., a series combinations). The series combination may be electrically coupled between terminals of a first port 202. The impedance of the hybrid transformer 200 measured at the first port 202 is the series impedance of the first primary winding 210 and the second primary winding 212. The first secondary winding 214 may be electrically coupled between terminals of a second port 204 that defines an electrical connection across the first secondary winding 214. The impedance of the hybrid transformer 200 measured at the second port 204 is the impedance of the first secondary winding 214. The second secondary winding 216 and the third secondary winding 218 may be electrically coupled in series such that the voltage polarities are opposite to define a third port 206. Since the voltage polarities are opposite in the series circuit, an identical voltage that appears across each of the second secondary winding 216 and the third secondary winding 218 results in zero voltage at the third port 206. The impedance of the hybrid transformer 200 measured at the third port 206 is the series impedance of the second secondary winding 216 and the third secondary winding 218. The fourth secondary winding 220 may be electrically coupled between terminals of a fourth port 208 that defines an electrical connection across the fourth secondary winding 220. The impedance of the hybrid transformer 200 measured at the fourth port 208 is the impedance of the fourth secondary winding 220.

The hybrid transformer 200 may be configured to transfer power between any combination of ports. For application in a power distribution system for the vehicle, the hybrid transformer 200 may be configured such that when power is provided at the first port 202, power is received at the second port 204 and the fourth port 208. The hybrid transformer 200 may be further configured such that when power is provided at the second port 204, power is received at the first port 202 and the third port 206.

The voltage at one of secondary windings is related to the voltage at the associated primary winding as follows:

$$V_s = (N_s/N_p) V_p \qquad (1)$$

where $V_s$ is the voltage across the secondary winding, $V_p$ is the voltage across the primary winding, $N_s$ is the number of wire turns on the secondary winding, and $N_p$ is the number of wire turns on the primary winding. The ratio of $N_s$ to $N_p$ may be referred to as the turns ratio. For the transformer to transfer power, the voltages must be alternating current (AC) voltages. The voltages $V_p$ and $V_s$ represent an AC voltage magnitude. Each of the secondary windings may have a predetermined number of turns to select a desired voltage transfer through the transformer. Each of the primary windings (e.g, 210, 212) may be configured to have the same number of turns. The number of turns may be selected to achieve appropriate voltage levels for components that are electrically coupled to the ports. Selection of the number of turns is described further herein.

Figure 3:
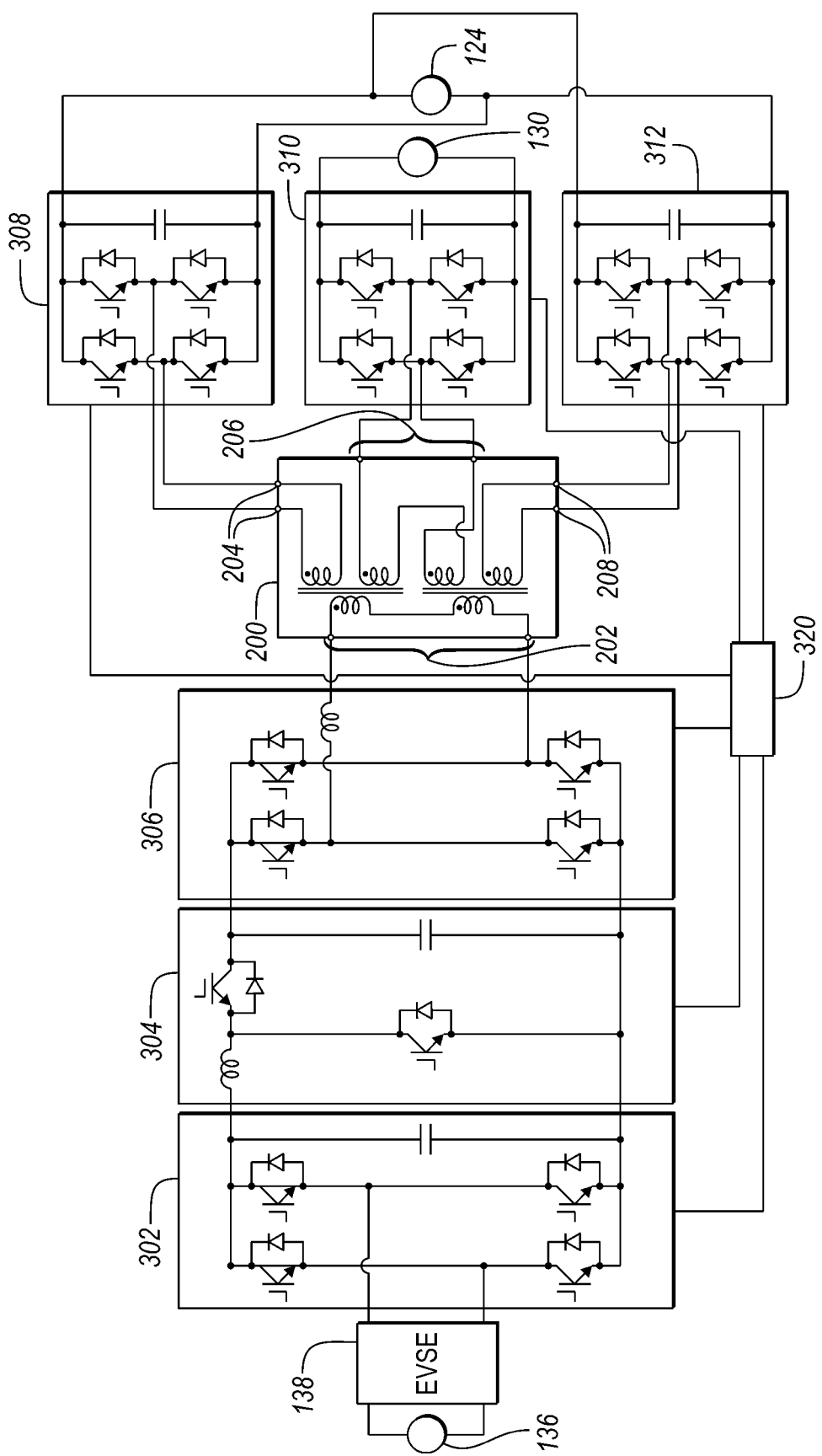
FIG. 3 is a schematic of an integrated vehicle power distribution module for an electrified vehicle.

FIG. 3 depicts a diagram of an integrated vehicle power distribution module that includes a charger and converter module utilizing the hybrid transformer 200. The first port 202 may be selectively electrically couplable to an external power source or load 136. The first port 202 of the hybrid transformer 200 may be electrically coupled to an onboard charger. The onboard charger may be configured to selectively couple the first port 202 to the external power source 136. The onboard charger may include one or more of the following stages. A first inverter stage 302 may be configured to convert between alternating current (AC) power and direct current (DC) power. The first inverter stage 302 may include switching devices that are configured to implement a bidirectional transfer of energy. The first inverter stage 302 may include a smoothing capacitor across a DC side. During vehicle charging, the first inverter stage 302 may convert an AC power input from the external source 136 to a DC output voltage. When supplying power to the grid or load, the first inverter stage 302 may convert DC power to AC power output to the off-vehicle equipment. In some configurations, the first inverter stage 302 may be eliminated. For example, if the external power source 136 provides DC power to the vehicle, then the first inverter stage 302 may not be necessary.

The first inverter stage 302 may be electrically coupled to a bidirectional boost converter 304. The boost converter 304 may be configured to change a voltage level of the DC voltage that is input to the boost converter 304. The boost converter stage 304 may be configured to operate in both directions. For example, during vehicle charging, the boost converter 304 may be operated to boost the voltage provided by the first inverter stage 302 at the output. When supplying power to the grid or load, the boost converter 304 may be operated to reduce the voltage being passed to the first inverter stage 302.

The boost converter stage 304 may be electrically coupled to a second inverter stage 306. The second inverter stage 306 may be configured to convert DC voltage to an AC voltage. During vehicle charging, the second inverter stage 306 may be operated to convert DC voltage provided by the boost converter 304 to an AC voltage for the hybrid transformer 200. When supplying power to the grid or load, the second inverter stage 306 may be operated to convert an AC voltage from the hybrid transformer 200 to a DC voltage for the boost converter 304.

The first inverter stage 302 may be configured to convert the voltage according to a frequency of the voltage of the external source 136. For example, if the external source 136 is a standard connection to the electrical grid, the frequency may be 60 Hz. The second inverter stage 306 may be configured to convert the voltage according to a frequency associated with the hybrid transformer 200. This frequency may be selected to optimize efficiency and performance of the energy transfer across the hybrid transformer 200. For example, a frequency of 10 KHz may be selected.

The second port 204 of the hybrid transformer 200 may be electrically coupled to AC-side terminals of a first inverter module 308. DC-side terminals of the first inverter module 308 may be electrically coupled to the traction battery 124. The first inverter module 308 may configured to bidirectionally convert power between AC power at the second port 204 to DC power at the traction battery 124.

The fourth port 208 of the hybrid transformer 200 may be electrically coupled to AC-side terminals of a second inverter module 312. DC-side terminals of the second inverter module 312 may be electrically coupled to the traction battery 124. The second inverter module 312 may configured to bidirectionally convert power between AC power at the fourth port 208 to DC power at the traction battery 124.

The third port 206 of the hybrid transformer 200 may be electrically coupled to AC-side terminals of a third inverter module 310. DC-side terminals of the third inverter module 310 may be electrically coupled to the auxiliary battery 130. The third inverter module 310 may configured to bidirectionally convert power between AC power at the third port 206 to DC power at the auxiliary battery 130.

An AC voltage applied to any of the windings of a transformer will induce an AC voltage across the other windings. The induced voltage will be a function of the turns ratio between the windings. Note that power may also be transferred between the secondary windings based on the same principles. The hybrid transformer 200 may be configured such that the first primary winding 210 and the second primary winding 212 have the same number of turns. The hybrid transformer 200 may be further configured such that the first secondary winding 214 and the fourth secondary winding 220 have the same number of turns. The hybrid transformer 200 may be further configured such that the second secondary winding 216 and the third secondary winding 218 have the same number of turns.

Alternatively, the hybrid transformer 200 may be configured such that the turns ratio between the first primary winding 210 and the first secondary winding 214 is the same as the turns ratio between the second primary winding 212 and the fourth secondary winding 220. The hybrid transformer 200 may be configured such that the turns ratio between the first primary winding 210 and the second secondary winding 216 is the same as the turn ratio between the second primary winding 212 and the third secondary winding 218.

The turns ratio for the windings may be selected based on the desired voltage levels. For example, the traction battery 124 may have a nominal voltage rating of 200 Volts. The auxiliary battery 130 may have a nominal voltage rating of 12 Volts. The turns ratio between the first primary winding 210 and the first secondary winding 214 may be a function of the traction battery voltage and the external source voltage magnitude. In a charging mode, the DC voltage output of the first inverter module 308 may be configured to exceed the traction battery voltage by a predetermined margin. The relative voltage magnitudes may determine if a step-up or step-down transformer configuration is needed. Similarly, the turns ratio between the fourth secondary winding 220 and the second primary winding 212 may be a function of the traction battery voltage and the external source voltage magnitude. The turns ratio between the first primary winding 210 and the second secondary winding 216 may be a function of the auxiliary battery voltage and the traction battery voltage. The turns ratio between the second primary winding 212 and the third secondary winding 218 may be a function of the auxiliary battery voltage and the traction battery voltage. The turns ratio may be a step-down ratio to ensure that the voltage level is reduced to a level that can be handled by the low-voltage bus and the auxiliary battery 130.

The system may further include at least one controller 320 that is configured to manage operation of the power distribution system. The controller 320 may be electrically coupled to the first inverter stage 302, the boost converter 304, and the second inverter stage 306. For example, the components may include switching devices for selectively coupling the external source 136 to the hybrid transformer 200. For example, the switching devices are depicted as insulated gate bipolar transistors (IGBT). Each IGBT may be operated by a gate signal that controls the conduction state of the device. The controller 320 may be configured with circuitry to provide the gate signals to the switching devices. The controller 320 may be programmed to operate the inverter stages and boost converter using algorithms and control strategies that are well-known by one of ordinary skill in the art. Although, not shown, the first inverter stage 302, the boost converter 304, and the second inverter stage 306 may include voltage and current sensors to provide input to the controller 320 for control and monitoring.

The controller 320 may be further electrically coupled to the first inverter module 308, the second inverter module 312, and third inverter module 310. Each of the components may include switching devices for selectively coupling the traction battery 124 or the auxiliary battery 130 to the hybrid transformer 200. For example, the switching devices are depicted as insulated gate bipolar transistors (IGBT). Each IGBT may be operated by a gate signal that controls the conduction state of the device. The controller 320 may be configured with circuitry to provide the gate signals to the switching devices. The controller 320 may be programmed to operate the inverter modules using algorithms and control strategies that are well-known by one of ordinary skill in the art. Although, not shown, the first inverter module 308, the second inverter module 312, and the third inverter module 3310 may include voltage and current sensors to provide input to the controller 320 for control and monitoring. It is understood that although a single controller is depicted, multiple controllers in communication with one another may provide equivalent functionality.

The controller 320 may be configured to operate the various systems to manage the flow of power through the hybrid transformer 200. The controller 320 may select a mode of operation based on operating conditions of the vehicle. Power flow through the power distribution system depends on the mode of operation. A first mode of operation may be a charging mode. In the charging mode, power may be received from the external source 136 for charging the vehicle. The charging mode may be configured to provide energy to the traction battery 124, but not the auxiliary battery 130.

In the charging mode, the external power source 136 may provide power to the vehicle. Specifically, the power that is received may be used to charge the traction battery 124. Power from the external power source 136 is input to the first inverter stage 302. When the external power source 136 provides AC power, the first inverter stage 302 may be operated to convert the AC input to a DC output. The first inverter stage 302 may be operated to convert AC power from the external source 136 to DC power at the boost converter 304. The controller 320 may operate the associated switching devices to achieve the conversion.

The DC power output of the first inverter stage 302 may be provided to the boost converter 304. The boost converter 304 may be operated to adjust the DC power level. For example, the DC voltage at the output provided to the second inverter stage 306 may be increased to be greater than the DC voltage from the first inverter stage 302. The controller 320 may operate the associated switching devices to achieve the desired DC voltage at the output of the boost converter 304.

The output of the boost converter 304 may be provided to the second inverter stage 306. The second inverter stage 306 may be operated to convert the DC voltage at the input to an AC voltage at the output of the second inverter stage 306. The controller 320 may operate the associated switching devices to achieve the conversion. The AC voltage output may have a predetermined magnitude and frequency. The frequency may be selected to minimize losses through the hybrid transformer 200. The AC voltage output is provided to the first port 202 of the hybrid transformer 200. As an example, a frequency of 20 KHz may be selected for transferring energy through the hybrid transformer 200. The controller 320 operates the switching devices to achieve the desired frequency and magnitude.

In the charging mode of operation, AC voltage is applied across the series combination of the first primary winding 210 and the second primary winding 212. The AC voltage will induce a voltage in the corresponding secondary windings. The AC voltage may be provided across the series combination of first primary winding 210 and the second primary winding 212 (e.g., across the first port 202). The AC voltage induces a voltage in each of the secondary windings according to the corresponding turns ratio. The hybrid transformer 200 may be configured so that the induced voltage across the second secondary winding 216 and the third secondary winding 218 are the same. The resulting voltage at the third port 206 is zero since the second secondary winding 216 and the third secondary winding 218 are electrically connected in series with the opposite voltage polarity. The voltage induced at the second secondary winding 216 is cancelled by voltage at the third secondary winding 218. As a result, no power is provided to the auxiliary battery 130.

An AC voltage is induced at the first secondary winding 214 (e.g., second port 204). The AC voltage may be input to the AC-side of the first inverter module 308. The first inverter module 308 may be operated to convert the AC voltage to a DC voltage at the DC-side of the first inverter module 308 that is coupled to the traction battery 124. In addition, an AC voltage is induced in the fourth secondary winding 220 (e.g., fourth port 208). The AC voltage may be input to the AC-side of the second inverter module 312. The second inverter module 312 may be operated to convert the AC voltage to a DC voltage at the DC-side of the second inverter module 312 that is coupled to the traction battery 124. In this manner, power from the external source is provided to the traction battery 124.

A second mode of operation may be an external power supply mode. In the external power supply mode, the traction battery 124 and/or the high-voltage bus may supply power to the external source 136. This mode permits the vehicle to power electrical loads that are plugged into the vehicle. This mode also permits providing power to the electrical grid during peak demand.

In the external power supply mode, the traction battery 124 is used to provide power to an external load. The external load may be the external source 136 and power may be provided to the electric grid. For example, during peak energy usage periods it may be beneficial to return energy stored in the traction battery 124 and recharge the traction battery 124 at a later time. The first inverter module 308 may be operated to convert DC power from the traction battery 124 to AC power at the hybrid transformer 200. The AC power is provided across the second port 204 of the hybrid transformer 200. As a result, AC power is transferred through the hybrid transformer 200 to the first port 202 and the third port 206. This mode of operation allows power to be transferred to both an external load and the auxiliary battery 130. The third inverter module 310 may receive AC power from the third port 206. The third inverter module 310 may be operated to convert the AC signal to a DC voltage across the auxiliary battery 130 and/or low-voltage power bus.

The second inverter stage 306 may receive AC power from the first port 202. The second inverter stage 306 may be operated to convert the AC power to a DC power for input to the boost converter stage 304. The boost converter stage 304 may be operated to pass the DC voltage to the first inverter stage 302. The first inverter stage 302 may be operated to convert the DC voltage received from the boost converter stage 304 to an AC power signal that is compatible with the external source 136 or external load. For example, if the system is providing power to the electrical grid or an electrical outlet, the AC signal may be controlled to be 110 VAC at a frequency of 60 Hz.

A third mode of operation may be a vehicle operation mode. In the low-voltage power bus supply mode, the traction battery 124 and/or the high-voltage bus may provide power for operating the low-voltage power bus without providing power to the onboard charging sub-system. In this mode, the first inverter module 308 may be operated to provide an AC voltage to the second port 204 of the hybrid transformer 200. The second inverter module 312 may be operated to provide an AC voltage to the fourth port 208 of the hybrid transformer 200 that is 180 degrees out of phase with that provided to the second port 204. By operating the inverter modules in this manner, the contribution of each of the AC voltages cancels out at the first port 202. The voltages across the first primary winding 210 and the second primary winding 212 will cancel as the polarities are opposite. As such, no power is provided to the onboard charger system. Further, power is provided to the third port 206 of the hybrid transformer 200. The third inverter module 310 may convert the power received at the third port 206 to DC power that is compatible with the low-voltage power bus and the auxiliary battery 130. This mode of operation may be used during a vehicle drive cycle and/or when the vehicle is powered on (e.g., ignition on condition).

The advantages of using the hybrid transformer 200 includes a reduction in packaging complexity. The hybrid transformer 200 allows controlling power flow between the traction battery 124, the auxiliary battery 130 and the electric utility without additional switches and contactors. This reduces power losses through the system. In addition, switches and contactors may be prone to arcing and degradation under certain conditions. In addition, the number of components are reduced as the DC/DC converter and onboard charger are integrated. Component stresses may be reduced as current is shared between the second port 204 and the fourth port 208.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a hybrid transformer including first and second primary windings directly coupled in series with opposite polarity and selectively electrically coupled to an external source, the first primary winding being configured to electro-magnetically couple to a first and second secondary winding, and the second primary winding being configured to electro-magnetically couple to a third and fourth secondary winding, the first and fourth secondary windings being selectively electrically coupled to a traction battery, and the second and third secondary windings being directly coupled in series with same polarity to define a port that is selectively electrically coupled to an auxiliary battery.

2. The vehicle of claim 1 wherein the first and second primary windings are coupled to the external source by at least one power inverter that is configured to bidirectionally convert power between direct current (DC) and alternating current (AC).

3. The vehicle of claim 2 wherein the first and second primary windings are coupled to the external source by a boost converter that is configured to bidirectionally convert a DC power level.

4. The vehicle of claim 1 wherein each of the first and fourth secondary windings is selectively electrically coupled to the traction battery by an inverter that is configured to bidirectionally convert power between direct current (DC) and alternating current (AC).

5. The vehicle of claim 1 wherein the port is selectively electrically coupled to the auxiliary battery by an inverter that is configured to bidirectionally convert power between direct current (DC) at the auxiliary battery and alternating current (AC) at the port.

6. The vehicle of claim 1 wherein the hybrid transformer is configured to, responsive to the first and second primary windings being coupled to the external source and the external source providing power, transfer power to the traction battery via each of the first and fourth secondary windings and provide no power to the auxiliary battery via the port.

7. The vehicle of claim 1 wherein the hybrid transformer is configured to, responsive to selectively coupling the traction battery to the first secondary winding configured to electro-magnetically couple to the first primary winding to provide an alternating current (AC) voltage, output AC voltage to the external source via the first primary winding and to the auxiliary battery via the port.

8. The vehicle of claim 1 wherein the hybrid transformer is configured to, responsive to selectively coupling the traction battery to the first and fourth secondary windings to provide an alternating current (AC) voltage such that the AC voltage provided to the first secondary winding configured to electro-magnetically couple to the first primary winding is 180 degrees out of phase with the AC voltage provided to the fourth secondary winding configured to electro-magnetically couple to the second primary winding, output AC voltage to the auxiliary battery via the port and provide AC voltage to the first and second primary windings such that a voltage across the series combination of the first and second primary windings is zero.

9. A vehicle power distribution system comprising:
a hybrid transformer including first and second primary windings directly coupled in series with opposite polarity to a first port that is selectively electrically couplable to an external source, the first and second primary windings being respectively coupled with a first secondary winding and a fourth secondary winding, and the first and second primary windings being respectively coupled with a second secondary winding and a third secondary winding, wherein the first and fourth secondary windings are selectively electrically coupled to a traction battery, and the second and third secondary windings are directly coupled in series with same polarity to define a second port that is selectively electrically coupled to an auxiliary battery.

10. The vehicle power distribution system of claim 9 further comprising an onboard charger including at least one bidirectional AC/DC conversion stage for selectively electrically coupling the first port to the external source.

11. The vehicle power distribution system of claim 9 further comprising a first inverter circuit for selectively coupling the first secondary winding configured to electro-magnetically couple to the first primary winding to the traction battery, a second inverter circuit for selectively coupling the fourth secondary winding configured to electro-magnetically couple to the second primary winding to the traction battery, and a third inverter circuit for selectively coupling the second port to the auxiliary battery.

12. The vehicle power distribution system of claim 9 wherein the hybrid transformer is configured to, responsive to the first port being selectively coupled to the external source and the external source providing power, transfer power to the traction battery via the first and fourth secondary windings and provide zero power to the auxiliary battery via the second port.

13. The vehicle power distribution system of claim 9 wherein the hybrid transformer is configured to, responsive to selectively coupling the traction battery to the first secondary winding configured to electro-magnetically couple to the first primary winding, transfer power to the external source via the first port and to the auxiliary battery via the second port.

14. The vehicle power distribution system of claim 9 wherein the hybrid transformer is configured to, responsive to selectively coupling the traction battery to the first and fourth secondary windings such that voltages supplied to the first and fourth secondary windings are 180 degrees out of phase with one another, transfer power to the auxiliary battery via the second port and provide zero power to the to the first port.

15. The vehicle power distribution system of claim 9 wherein the first primary winding and corresponding first secondary winding are characterized by a turns ratio that has a same value as the turns ratio that characterizes the second primary winding and corresponding fourth secondary winding.

16. The vehicle power distribution system of claim 9 wherein a turns ratio that characterizes the first primary winding and corresponding second secondary winding has a same value as the turns ratio that characterizes the second primary winding and corresponding third secondary winding.

17. An integrated vehicle power distribution module comprising:
a transformer;
a charger coupled to a series combination with opposite voltage polarity of first and second primary windings of the transformer;
first and second inverters coupled between a traction battery and first and fourth secondary windings configured to electro-magnetically couple to each of the primary windings; and
a third inverter coupled between an auxiliary battery and second and third secondary windings configured to electro-magnetically couple to each of the primary windings, the second and third secondary windings being directly connected in series with same voltage polarities.

18. The integrated vehicle power distribution module of claim 17 wherein the transformer is configured to, responsive to the charger being coupled to an external source and the external source providing power, transfer power to the first and second inverters via the first and fourth secondary windings such that zero power is transferred to the third inverter.

19. The integrated vehicle power distribution module of claim 17 wherein the transformer is configured to, responsive to operating the first inverter to provide alternating current (AC) voltage to the first secondary winding configured to electro-magnetically couple to the first primary winding, transfer power to the charger via the first primary winding and to the third inverter via the second secondary winding configured to electro-magnetically couple to the first primary winding.

20. The integrated vehicle power distribution module of claim 17 wherein the transformer is configured to, responsive to operating the first and second inverters to provide alternating current (AC) voltages to the first and fourth secondary windings which are 180 degrees out of phase with one another, transfer power to the third inverter and transfer zero power to the charger.

* * * * *